(12) United States Patent
Maddelein et al.

(10) Patent No.: US 7,229,133 B2
(45) Date of Patent: Jun. 12, 2007

(54) VEHICLE SEAT ADJUSTMENT SYSTEM INCLUDING AN OCCUPANT PROTECTION ADJUSTMENT

(75) Inventors: Michael G. Maddelein, Northville, MI (US); Hugh H. Christopher, West Bridgford (GB)

(73) Assignee: Lear Corporation, Southfield, MI (US)

( * ) Notice: Subject to any disclaimer, the term of this patent is extended or adjusted under 35 U.S.C. 154(b) by 169 days.

(21) Appl. No.: 10/993,626

(22) Filed: Nov. 19, 2004

(65) Prior Publication Data

US 2005/0146174 A1 Jul. 7, 2005

(30) Foreign Application Priority Data

Dec. 19, 2003 (GB) .................................. 0329365.1

(51) Int. Cl.
*B60N 2/427* (2006.01)
*B60N 2/06* (2006.01)
*B60R 21/013* (2006.01)

(52) U.S. Cl. .............................. 297/362.13; 297/216.1; 297/216.13; 297/216.14; 297/216.15; 297/216.16; 297/216.18; 297/216.19; 297/344.1; 297/344.11

(58) Field of Classification Search ............. 297/216.1, 297/216.13, 216.14, 216.15, 216.16, 216.18, 297/216.19, 344.1, 344.11, 344.16, 344.19, 297/362.13
See application file for complete search history.

(56) References Cited

U.S. PATENT DOCUMENTS

| 3,732,944 | A | * | 5/1973 | Kendall ............. 297/216.15 X |
| 3,760,911 | A | | 9/1973 | Porter et al. |
| 3,777,617 | A | | 12/1973 | Okiyama |
| 3,860,098 | A | | 1/1975 | Porter et al. |
| 3,927,911 | A | | 12/1975 | Rosquist |
| 3,992,046 | A | * | 11/1976 | Braess ............... 297/216.18 X |
| 4,285,545 | A | * | 8/1981 | Protze ................ 297/216.1 X |
| 4,550,750 | A | | 11/1985 | Korth |
| 4,720,143 | A | | 1/1988 | Schwartz et al. |
| 5,244,252 | A | * | 9/1993 | Serber ................... 297/216.19 |
| 5,290,089 | A | * | 3/1994 | Oleszko et al. ........ 297/216.14 |
| 5,435,625 | A | | 7/1995 | Weber .................... 297/362.13 |
| 5,460,427 | A | * | 10/1995 | Serber ................... 297/216.19 |
| 5,558,399 | A | * | 9/1996 | Serber ............... 297/216.15 X |
| 5,613,733 | A | * | 3/1997 | Miller et al. ............. 297/344.1 |
| 5,626,203 | A | * | 5/1997 | Habib ............... 297/216.18 X |

(Continued)

FOREIGN PATENT DOCUMENTS

DE 24 15 769 10/1975

(Continued)

*Primary Examiner*—Rodney B. White
(74) *Attorney, Agent, or Firm*—MacMillan, Sobanski & Todd, LLC

(57) ABSTRACT

A vehicle seat adjustment system for adjusting the position of a portion of a vehicle seat. The system comprises a hydraulic actuator, a primary activation system for operating the hydraulic actuator and adjusting the seat position, and a secondary activation system for the hydraulic actuator. The secondary activation system is arranged to be activated in the event of a detected crash, to provide for movement of the hydraulic actuator to automatically adjust the position of a portion of the seat towards a predetermined position. The secondary activation system comprises a chamber to allow fluid to be displaced from the hydraulic actuator into the chamber. The secondary activation system may additionally comprise a fluid injection unit which supplies a quantity of fluid, preferably gas, to the actuator.

18 Claims, 3 Drawing Sheets

U.S. PATENT DOCUMENTS

| | | | |
|---|---|---|---|
| 5,735,574 A * | 4/1998 | Serber | 297/216.15 X |
| 5,743,591 A | 4/1998 | Tame | 297/362.13 X |
| 6,015,130 A | 1/2000 | Kigel | |
| 6,047,797 A | 4/2000 | Popjoy | |
| 6,050,637 A * | 4/2000 | H.ang.land et al. | 297/216.14 |
| 6,059,253 A | 5/2000 | Koutsky et al. | |
| 6,062,643 A * | 5/2000 | Schroten et al. | 297/216.13 |
| 6,142,564 A | 11/2000 | Pajela et al. | |
| 6,161,633 A | 12/2000 | Broom | |
| 6,179,379 B1 * | 1/2001 | Andersson | 297/216.13 |
| 6,193,297 B1 * | 2/2001 | Vandermolen | 297/216.15 X |
| 6,227,563 B1 * | 5/2001 | Talisman | 297/216.15 X |
| 6,244,656 B1 * | 6/2001 | Mueller | 297/216.13 |
| 6,382,491 B1 | 5/2002 | Hauser et al. | |
| 6,637,816 B2 * | 10/2003 | Pavlov et al. | 297/216.16 X |
| 6,720,750 B2 * | 4/2004 | Stachowski et al. | 297/216.19 |
| 2002/0130542 A1 | 9/2002 | Ellerich et al. | |
| 2002/0145315 A1 * | 10/2002 | Fraley et al. | 297/216.13 |
| 2003/0052519 A1 * | 3/2003 | Reynolds et al. | 297/216.1 |
| 2003/0209929 A1 | 11/2003 | Muin et al. | |
| 2004/0113474 A1 * | 6/2004 | Lambrecht et al. | 297/344.1 |

FOREIGN PATENT DOCUMENTS

| | | |
|---|---|---|
| DE | 202 15 969 | 2/2003 |
| DE | 101 52 561 | 5/2003 |
| EP | 0 316 675 | 5/1989 |
| EP | 0 575 733 | 12/1993 |
| EP | 0 878 348 | 11/1998 |
| EP | 1 077 153 | 2/2001 |
| EP | 1 188 608 | 3/2002 |
| GB | 676313 | 7/1952 |
| GB | 897955 | 6/1962 |
| GB | 1 473 113 | 5/1977 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

VEHICLE SEAT ADJUSTMENT SYSTEM INCLUDING AN OCCUPANT PROTECTION ADJUSTMENT

CROSS REFERENCE TO RELATED APPLICATIONS

This application claims priority to Great Britain Patent Application No. 0329365.1 filed Dec. 19, 2003, the disclosures of which are incorporated herein by reference.

BACKGROUND OF THE INVENTION

The present invention relates to adjustable vehicle seats, in particular to hydraulically adjustable automotive vehicle seats, and to improving seat occupant protection in the event of a vehicle crash or impact.

In order to comfortably accommodate various sizes and shapes of occupants vehicle seats are generally provided with various adjustment mechanisms to adjust the position of the seat within the vehicle and/or move various movable portions of the seat. Typically vehicle seats are provided with fore and aft adjustment, and the seat back is pivotally mounted to a seat bottom cushion such that the angle of the seat back to the bottom cushion of the seat can be adjusted. Other adjustment and adjustment mechanisms may also be provided to, for example, adjust the height of the vehicle seat, angle and tilt of the seat bottom cushion, position of the headrest, and/or the lumber support etc.

The seat adjustment mechanisms whilst allowing the position of the seat and/or seat portions to be adjusted to the desired position also importantly securely lock the seat and/or seat portion in the desired position.

The seat adjustment mechanisms may be manually operable and mechanically locked in place, or increasingly some or all may be power operated and either mechanically or otherwise locked in place. Conventionally various mechanical and for power operated adjustment mechanisms electromechanical arrangements are used. It has also been proposed to use hydraulic adjustment arrangements comprising hydraulic actuator cylinders operatively connected between the movable portions of the seat with suitable control valves to prevent fluid flow and lock the seat position. By suitably arranging the hydraulic actuators and connecting the actuators to a pump supplying pressurised hydraulic fluid in a suitable hydraulic circuit a hydraulically powered seat adjustment can be provided. An example of a powered hydraulic adjustment system is described, for example, in U.S. Pat. No. 5,435,625. An example of a hydraulic seat position locking arrangement is described in U.S. Pat. No. 5,743,591.

There is a general desire within the automotive field to improve the protection provided to an occupant in the event of a vehicle crash or impact. In a vehicle crash or impact significant and violent loads are applied to the vehicle and occupant. These loads, and the resulting violent movement of the occupant under the loads can cause injury to an occupant. In addition the occupant may, depending upon the size of the occupant and the adjusted seat position, also hit and contact various parts of the vehicle interior again resulting in injury.

To address these problems vehicle designers carefully design vehicle interiors and increasingly provide various 'occupant protection' systems. In particular airbags which automatically inflate in the event of a crash and which cushion an occupant are now common. Seat belts to restrain a seat occupant are also now compulsory in at least some countries, and may also include seat belt pretensioners.

Increasing adjustment of the seat and seat position is being demanded, with adjustment over increasing ranges to more comfortably accommodate different seat occupants. The increasing adjustability of vehicle seats, and so diverse and different position of the seat occupant, however presents a problem when designing such occupant protection systems and vehicle interiors. Specifically any occupant protection system must safely operate over the entire range of seat positions and for all different sizes of seat occupant. In addition airbags in themselves may cause injury to an occupant in particular if the occupant is positioned too close and/or not correctly siting within the vehicle.

It is therefore generally desirable to improve the occupant protection provided to a vehicle occupant, as well as address some of the above mentioned problems with conventional arrangements. In particular it is desirable to provide an improved adjustable vehicle seat which improves the protection provided to an occupant in the event of a crash.

SUMMARY OF THE INVENTION

According to the present invention there is provided a hydraulic vehicle seat adjustment system, and a vehicle seat including such an adjustment system, as described in the accompanying claims.

In an aspect of an embodiment of the invention there is provided a vehicle seat adjustment system for adjusting the position of a portion of a vehicle seat. The system comprises a hydraulic actuator, a primary activation system for the hydraulic actuator, and a secondary activation system for the hydraulic actuator. The hydraulic actuator is arranged to, in use, adjust the position of a portion of the seat. The primary activation system controls a flow of hydraulic fluid to the hydraulic actuator to operate the hydraulic actuator. The secondary activation system, which is arranged to be activated in the event of a detected crash, is arranged to provide for movement of the hydraulic actuator to automatically adjust the position of a portion of the seat towards a predetermined position.

In this manner the seat or seat portions can be automatically moved into the optimum, or better, positions to provide maximum support for a seat occupant in the event of a crash and/or move the seat and seat occupant a relative amount for example away from the dashboard or other interior items as well as any airbags to reduce the risk of injury. In addition by moving the seat or seat portions to a predetermined and known consistent position other occupant protection systems can be optimised for that position. The range of seat and occupant positions over which a designer has to consider in the event of a crash or impact is thereby reduced, simplifying the interior design considerations. Furthermore since the seat and seat occupant in the event of a crash is placed towards a particular position the normal seat adjustment range can be increased since as the seat is moved in the event of a crash the normal seat position is does not need to be limited by crash and impact considerations. Even simply moving the seat by a relative amount, rather than necessarily to a specific absolute position, can also reduce the risk of impact with other parts of the vehicle interior, improve the positioning of the occupant for better protections, and/or absorb some of the impact energy.

Preferably the secondary activation system comprises a chamber and a valve connected to the actuator which when activated operate to allow fluid to be displaced and flow from the hydraulic actuator through the valve into the chamber. The valve may comprise a pressure activated valve which opens when the pressure within the actuator exceeds a predetermined level. A movable piston preferably divides the chamber into a first chamber to receive fluid from the actuator and a second chamber containing a compressible gas.

The secondary activation system may additionally comprise a fluid injection unit which supplies a quantity of fluid, preferably gas, to the actuator.

In a further aspect of an embodiment of the invention there is provided a vehicle seat adjustment system for adjusting the position of a portion of a vehicle seat. The system comprises a hydraulic actuator arranged to, in use, adjust the position of a portion of the seat, and a gas injector unit which is activated in the event of a detected crash to inject a quantity of gas into the hydraulic actuator.

The injection of gas into the hydraulic actuator, due to the compressibility of the gas, provides a degree of cushioning and impact energy absorption in the seat mounting and positioning of the seat and/or seat portion. This reduces the impact loads on a seat occupant and improves occupant protection.

Other advantageous features, advantages and aspects of the invention will also be apparent to those skilled in the art form the following more detailed description.

DETAILED DESCRIPTION OF THE INVENTION

Figure 1:
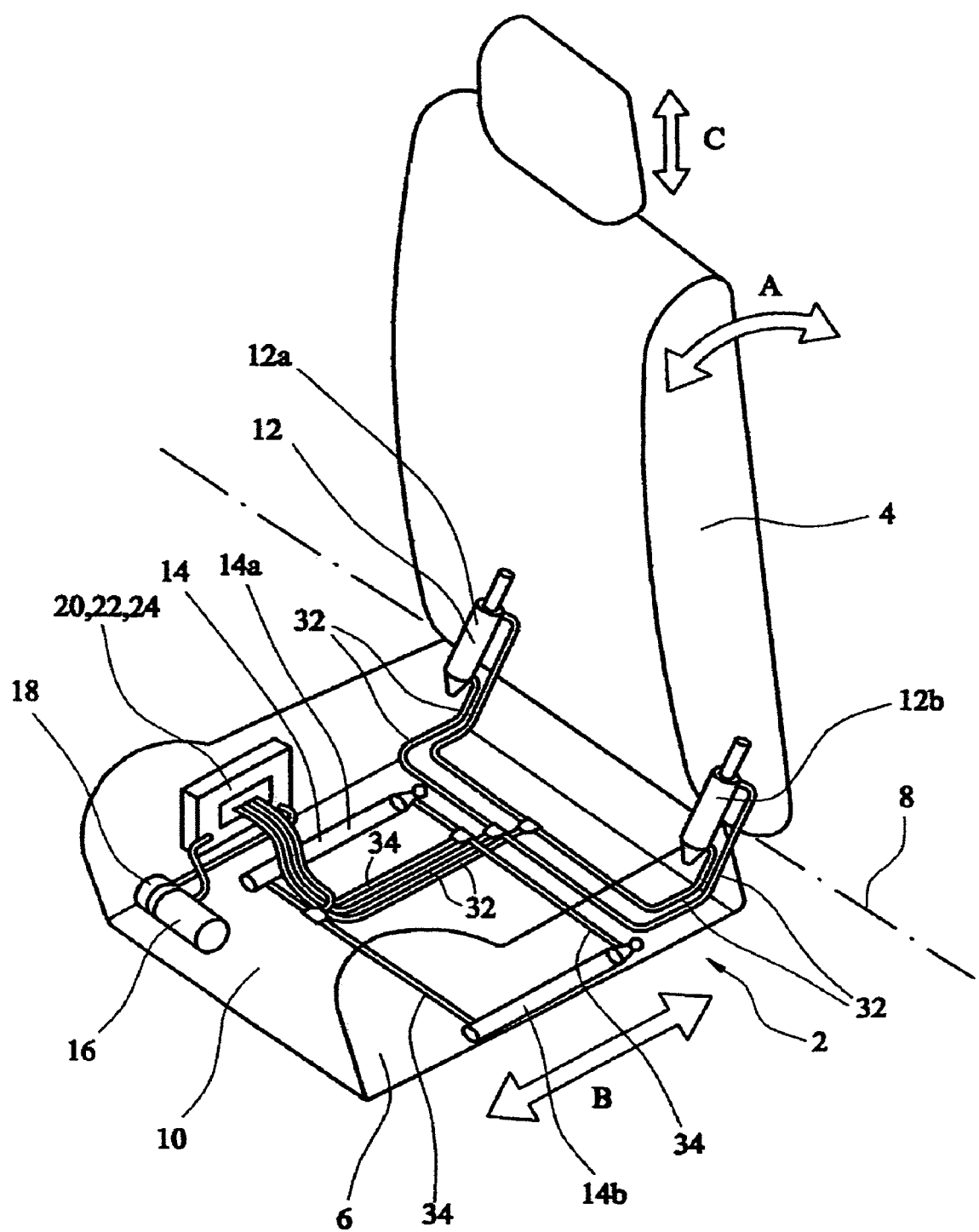
FIG. 1 is a schematic perspective illustration showing the general disposition of a hydraulic vehicle adjustment system within a vehicle seat.

Referring to FIG. 1 there is shown a schematic illustration of the disposition of a hydraulically powered seat adjustment system 10 within an outline of an automotive vehicle seat 2.

The vehicle seat 2 includes a seat back 4 which is pivotally connected to a bottom seat cushion 6, in a conventional manner, at one end about a horizontal lateral axis 8. The angle of the seat back 4 can accordingly be adjusted relative to the generally horizontally disposed seat bottom cushion 6 as indicated by arrow A. A pair of seat pivot hydraulic actuators 12a, 12b, one on each lateral side of the seat 2, are operatively connected between the seat back 4 and seat bottom cushion 6 to adjust, control, and set the angle of the seat back 4.

The seat bottom cushion 6 is slidably mounted to the vehicle floor (not shown) in a conventional manner, for example using a pair of sliding seat tracks or rail assemblies (not shown). This allows the seat cushion 6 and seat 2 to be slid fore and aft as indicated by arrow B. A pair of seat track hydraulic actuators 14a, 14b are provided to adjust and set the fore and aft position of the seat bottom cushion 6 and seat 2 along the rail assemblies and within the vehicle.

It will be appreciated that the seat 2 may be, and preferably is, mounted to provide for other movement and adjustment for example to adjust the height of the vehicle seat 2, and/or angle and tilt of the seat bottom cushion 6. The seat 2 may also include further movable portions for example a movable headrest (as indicated by arrow C), and/or the lumber support. Further pairs of actuators, or single actuators, may accordingly be similarly provided for such further adjustable mountings and/or movable portions.

Figure 2:
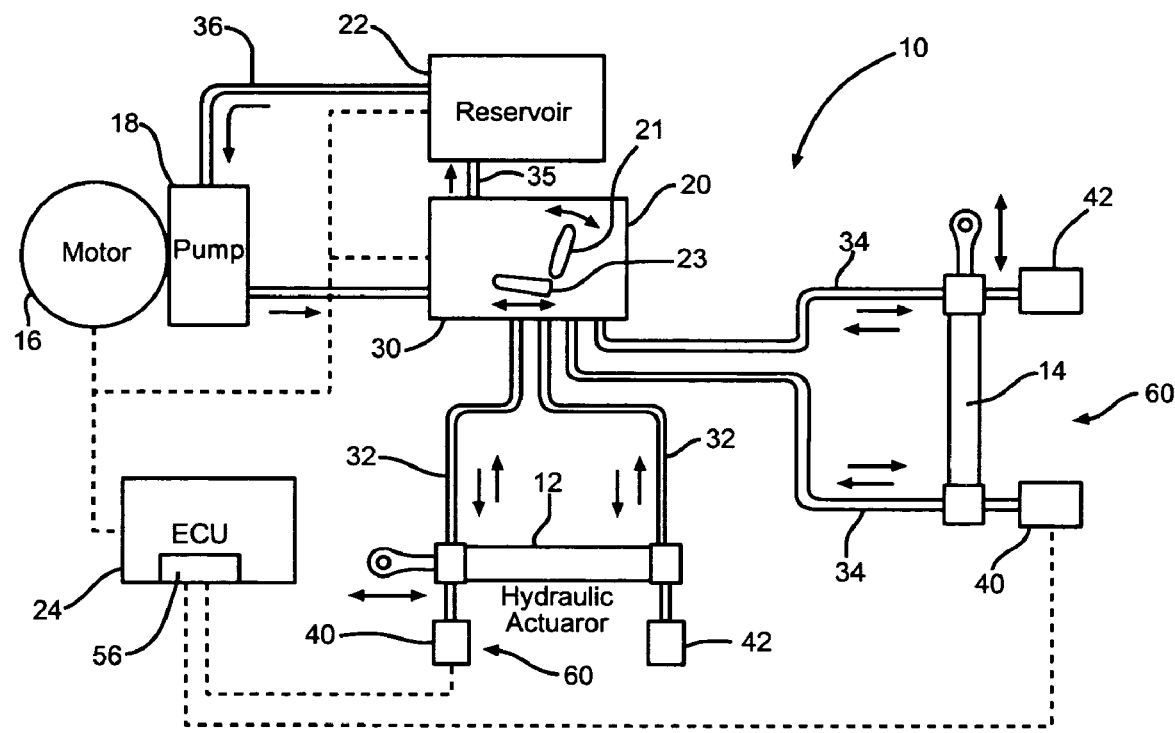
FIG. 2 is a schematic simplified illustration of the the hydraulic vehicle adjustment system of FIG. 1.

The hydraulic adjustment system 10, and the hydraulic circuit, is shown more clearly in simplified schematic form in FIG. 2. In FIG. 2 only one actuator 12, 14 of each of the pair of actuators 12a, 12b, 14a, 14b is shown for simplicity, with the other actuators connected in parallel with the respective illustrated actuator. The hydraulic adjustment system 10 comprises a hydraulic pump 18 driven by an electric motor 16. The pump 18 is connected to and in fluid communication with a control module 20. The pump 18 supplies pressurised hydraulic fluid via a supply pipe 30 to the control module 20. The control module 20 includes control valves (not shown) which selectively in use direct and control a flow pressurised fluid supplied from the control module 20 to the respective hydraulic actuators 12, 14 via actuator supply/return pipes 32, 34. The control valves are activated by switches 21, 23 operated by a user. Supply/return pipes 32, 34 also return the hydraulic fluid from the hydraulic actuators 12, 14 via the control module 20, and the control valves 40, to a reservoir 22 which stores an operating quantity of hydraulic fluid. The hydraulic fluid is supplied from the reservoir 22 to the pump 18 via a pump feed pipe 36 competing the hydraulic circuit.

The hydraulic circuit preferably operates at a relatively low hydraulic pressure, typically 20 bar and can be contrasted with conventional hydraulic systems which generally operate at much higher pressures. This low pressure also, to some degree, enables a secondary activation system in accordance with the invention and described further below, to be readily and easily incorporated.

The control module may comprise the control module as described in co-pending UK patent application number 0324552.9 filed on 22 Oct. 2003 the contents of which are incorporated herein by reference.

An electronic control unit 24 is preferably operatively connected to the motor 16, control module 20 and various other sensors (not shown), to monitor and control the operation of the hydraulic adjustment system 10. The electronic control 24 unit may also include a memory unit to store previously set seat positions for different occupants and a control unit arranged to operate (via suitable solenoids) the control valves 40 in place of, or in addition to, the manual switches 21, 23. Such electronic control units 24 with memory units and arranged to operate powered seat adjustment systems are in themselves known in the art for use with conventional electromechanical seat adjustment systems and can be adopted and used with the above described hydraulic system 10.

Figure 3:
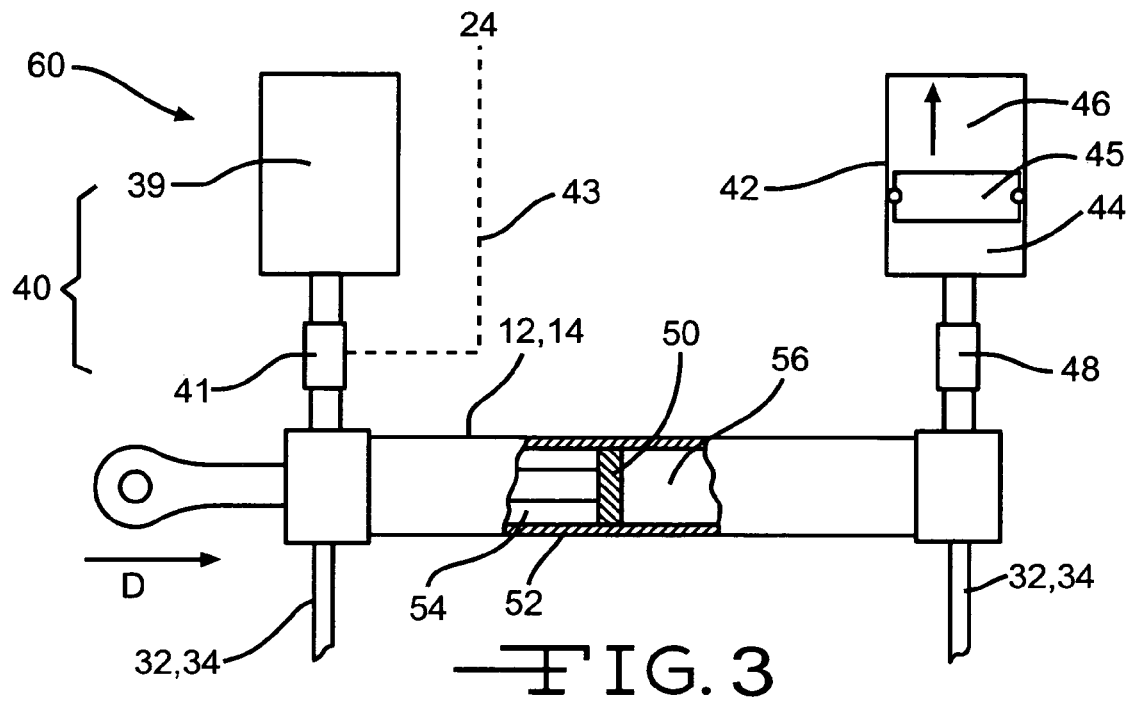
FIG. 3 is a more detailed schematic simplified illustration of one of the actuators of the hydraulic adjustment system shown in FIGS. 1 and 2, showing the secondary activation system connected to the actuator in accordance with an embodiment of the present invention.

The hydraulic actuators 12, 14 comprise a hydraulic piston 50 mounted within a cylinder 52 as shown in FIG. 3 in which a portion of the actuator cylinder is cutaway and shown in cross section. The actuator 12, 14 extends and retracts in response to hydraulic fluid supplied via the supply/return pipes 32, 34 to the actuator 12, 14 and to the chambers 54, 56 defined on either side of the piston 50 mounted within the actuator cylinder 52. Extension and retraction of the actuator 12, 14 adjusts the position of the seat 2 or respective seat portion 4, 6 to which the actuator 12, 14 is connected. With the control valves 40 of the control module 20 closed the flow of hydraulic fluid to and from the actuators 12, 14 via the supply and return pipes 32, 34 is prevented. This effectively prevents movement of the piston 50 and locks the actuator 12, 14 thereby securely fixing and locking the position of the seat 2 or respective seat portion 4, 6 to which the actuators 12, 14 are connected.

In normal operation to adjust, for example, the angle of, and recline, the seat back 4 a seat occupant operates the respective switch 21 on the control module 20 on the side valance of the seat 2. This operates the respective control valves within the control module 20 to interconnect and direct hydraulic fluid from the supply pipe 30 to one of the supply/return pipes 34 connected to the seat pivot actuator 12, and to interconnect and direct hydraulic fluid from the other of the supply/return 34 pipes from the seat pivot actuator 12 to the return pipe 35. At the same time the switch 21, movement of the valves, or the pressure change in the supply pipe 30 activates the motor 16 and pump 18 to generate a flow of pressurised hydraulic fluid which is supplied and directed to the seat pivot actuator 12 causing the actuator 12 to extend and recline the seat back 4. Once the desired reclined position is achieved the occupant releases the switch 21, which closes the valves and stops the pump 18. The closed valves prevent flow of fluid from the supply/return pipes 34 thereby preventing further movement of the seat pivot actuator 12 and so secure and lock the seat back 4 in the desired position. To move the seat back 4 to a more upright position the switch 21 is moved in the opposite sense, or a second switch is pressed, which operates the valves to direct and interconnect the supply/return pipes 34 to the supply 30 and return 35 in the opposite manner to produce an opposite flow of hydraulic fluid such that the pivot actuator 12 retracts moving the seat back 4 to a more upright position. Adjustment of the fore and aft position and seat track actuators 12, as well as any other adjustment provided by any further actuators is similar.

In addition to the above described arrangement for primarily activating and controlling the various actuators 12, 14 to adjust and set the seat position, there is also in accordance with the invention, a secondary activation system 60 connected to and associated with at least one of the actuators and adjustments. This secondary activation system 60 is arranged to be activated in the event of a crash or impact and provides for movement of the actuator 12, 14 and resulting adjustment of the associated seat position from any arbitrary position towards a predetermined position and/or by a specific predetermined relative amount and degree. The predetermined position is selected so as to provide for optimal (or at least improved) seat occupant protection in particular in conjunction with the occupant protection systems of the vehicle. Similarly the relative movement is arranged to move the seat towards a more optimal occupant protection/support position, and/or provide a degree of impact energy absorption, and/or simply move the seat and so occupant away from other parts of the interior that an occupant my hit in the event of an impact. This for example may comprise placing the seat 2, and/or seat portion (eg. seat back 4 and/or headrest) into the best position to provide support for the occupant. Specifically it may comprise moving the seat 2 rearwards to reduce the possibility of the seat occupant hitting the dashboard, steering wheel and interior trim. It may comprise moving the headrest forwards and/or upwards so as to be in a better position to support an occupants head an prevent whiplash injury. It may comprise raising the front of the seat bottom cushion 6 relative to the rear of the seat bottom cushion (using seat height/bottom cushion tilt actuators) tilting the bottom cushion 6. Such tilting of the bottom cushion 6 prevents 'submarining' and an occupant from sliding forwards off the seat.

In addition with the seat 2, and seat portions in (or at least moved towards) a predetermined position, the seat occupant will be placed in a more consistent and known position during a crash. This simplifies and reduces the different seat 2 and occupant positions over which other occupant protection systems have to be designed to accommodate. Furthermore the other occupant protection systems can be better optimised for that particular (or reduced range of) seat and occupant position. As a result overall occupant protection is improved whilst still allowing a full and wide (and possibly increased) range of seat adjustment to be provided.

In the embodiment shown in FIG. 2 both the actuators 12, 14 for adjustment of the fore and aft position of the seat 2 and for pivoting the seat back 4 incorporate the secondary activation system 60, as will be described further below. It will though be appreciated that the secondary activation system 60 could be provided for only one or the adjustments (for example fore and aft only), or indeed for other seat adjustments as may be provided. The secondary activation system 60 is though particularly advantageous when used in for the fore and aft seat adjustment, seat bottom cushion tilt adjustment, and/or headrest position. It will of course be appreciated that not all of the actuators of a vehicle seat 2 need though incorporate a secondary activation system 60.

It will be appreciated that the movement provided by the secondary activation system 60 and its operation is extremely rapid, as compared to the normal adjustment and is commensurate and comparable with the speed of movements generated by a crash or impact in order to move the seat to the required position at the appropriate time.

Referring to the embodiment shown in FIG. 3 the secondary activation system 60 comprises a gas injector unit 40, and displacement chamber assembly 42 connected to the hydraulic actuators 12, 14.

The gas injector unit 40 is arranged, when activated, to inject gas into the actuator 12, 14, and into the actuator chamber 54 on one side of the piston 50. The gas injector unit 40 is similar to those conventionally used for vehicle airbags and will be familiar to those skilled in the art. The gas injector unit 40 may in particular comprise a gas cylinder 39 storing pressurised gas and an activation valve 41 to release the pressurised gas. Alternatively the gas injector may be arranged to inject a liquid, for example hydraulic fluid, rather than a gas. By injecting hydraulic fluid more direct movement of the actuator 12, 14 is provided since a fluid is incompressible. In addition injected hydraulic fluid will not contaminate the hydraulic system 10 which is filled with hydraulic fluid. However it is preferred to inject gas since this provides additional advantages as discussed further below.

The displacement chamber assembly 42 is connected via a pressure activated valve 48 to the actuator 12, 14 and is arranged to receive, when the pressure activated valve 48 is open, fluid displaced from the actuator 12, 14 and actuator chamber 56 on the opposite side of the piston 50. The pressure activated valve 48 preferably opens when the pressure within the actuator cylinder 52 and chamber 56 exceeds a predetermined level. The displacement chamber assembly 42 allows the piston 50 to move by allowing hydraulic fluid to be displaced from the actuator with the control valves of the main hydraulic circuit 10 being closed and preventing hydraulic fluid from flowing from the actuator 12, 14 via the supply and return pipes 32, 34. As illustrated the displacement chamber assembly 42 is divided by a movable piston 45 into a first chamber 44 for the fluid displaced and a second chamber 46. The second chamber preferably contains a gas, for example air. The second chamber 46 may be sealed, as shown, or alternatively may include a vent to allow the gas within the second chamber 46 to escape. The piston 45 ensures that the hydraulic fluid is contained within the system, and by providing a separate air chamber, keeps the fluid within the hydraulic systems separate from the gas/air in the chamber 46. In alternative arrangements the piston 45 could be omitted, or replaced by a flexible diaphragm.

The gas injector 40 is activated and triggered by vehicle crash or impact sensors 56 in the event of a detected crash or impact. Such crash or impact sensors 56 are well known in the art. As shown in this embodiment the crash sensors 56 may be included as part of the seat electronic control unit 24 with a control wire 43 connecting to the gas injector 40 and in particular activation valve 41. Alternatively, an preferably, the crash sensors may comprise part of, and/or be integrated with the other vehicle occupant protection systems, for example airbag system, seat belt pretensioners and/or other vehicle control systems. The other occupant protections system, and/or measurements from other sensors for example sensing the presence of and position of an occupant in the seat, size of occupant, type and direction fo impact etc may further control the operation of the secondary activation system 60. The integration of the seat secondary crash activation system 60 with other systems further improves the overall occupant protection provided.

In the event of a crash or impact detected by the crash/impact sensors 56 the secondary activation system 60 is activated, and in this embodiment the gas injector unit 40 (and specifically activation valve 41) is triggered. The gas injector unit 40 then rapidly (in comparison to normal adjustment speeds), and substantially instantaneously, injects gas into the actuator chamber 54 on one side of the piston 50. This increases the pressure in that chamber 54 and on that side of the actuator piston 50 causing the piston 50 to move, and as shown in FIG. 3 to the right to retract the actuator 12, 14. The movement of the piston 50 pressurises the fluid in the chamber 56 on the opposite side of the piston 50. This increase in pressure opens the pressure activated valve 48 allowing fluid from the chamber 56 to be displaced into the chamber 44 of the displacement chamber assembly 42. This moves piston 45 within the displacement chamber assembly 42 compressing and/or venting the gas from within the other chamber 46. The displacement chamber assembly 42, by allowing fluid to be displaced from the actuator 12, 14 assists in allowing movement of the actuator 12, 14. The resulting movement of the actuator 12, 14, in this embodiment retraction, moves the seat 2 or seat portion (eg. seat back 4) to which the actuator 12, 14 is attached. By careful sizing of the gas injector unit 40 and amount of gas injected, and/or of the displacement chamber assembly 42 the degree of movement generated, and so resulting position to which the seat 2 or seat portion is adjusted to can be controlled so that the actuator 12, 14 moves the seat 2 or seat portion towards a specific predetermined position, for example fully rearward or aft position, or the seat back into a fully upright position. Alternatively, and more simply the seat portion can simply be moved by a specific relative amount and degree.

Whilst as described above retraction D of the actuator 12, 14 is provided, it will be appreciated that the arrangement can be readily configured to provide extension by simply altering the position of the gas injector unit 40 and displacement chamber assembly 42.

The compression and/or controlled venting of gas from the chamber 46 of the displacement chamber assembly 42, and compressibility of the gas within the chamber 46, controls and cushions the rapid movement of the actuator 12, 14, and so of the seat 2 or seat portion towards the predetermined position. In addition the gas injected into the actuator chamber 54 due to its compressability as compared to the incompressible hydraulic fluid, permits a small degree of resilient movement of the actuator 12, 14. This also cushions the crash/impact loading, allowing slower gentler deceleration and also absorbing some of the imapct energy thereby providing improved occupant protection. This cushioning and impact energy absorption provided by either or both the gas injected and/or gas within the displacement chamber assembly 42 is an important further, and to some degree separate, aspect of the invention. Indeed in a further embodiment (not shown) a gas injector unit 40 could be used alone without the displacement chamber assembly 42, to simply inject gas into the actuator 12, 14 simply to provide cushioning and impact energy absorption by compression of the injected gas and without and significant alteration of the actuator 12, 14 position.

The gas injector unit 40 can be arranged to inject varing amounts of gas to cause different amounts of movement, for example dependent upon the seat 2 position previously set and/or other requirements for example detected size of the seat occupant and/or for example if there are rear passengers seated in the vehicle. Similarly and additionally or alternatively, the sizing of the displacement chamber 42 or duration over which the valve 48 is open, can be varied to control and cause different amounts of movement. In such cases the ECU 24 or other control units of the vehicle would control the operation of the gas injector unit 40.

Seat sensors or other vehicle sensors and/or systems may also control the operation of the secondary activation systems 60. For example the secondary activation system 60 may only be selectively armed and ready to be activated in the event of a detected crash if it is identified by sensors that the seat 2 is occupied. Furthermore the secondary activation system 60 may be armed (or disarmed) only when the seat 2, or seat portion, is in a particular adjusted position or range of positions. For example if the seat 2, or seat portion, is already in an optimum occupant protection system then the secondary activation system 60 is not needed to move the seat 2, or seat portion, and may therefore be disarmed. Conversely if the seat 2, or seat portion, is in a poor occupant protection position (eg. the seat is far forward beyond a particular forward position) then the secondary activation system 60 may be selectively armed so that it will operate in the event of a detected crash.

Figure 4:
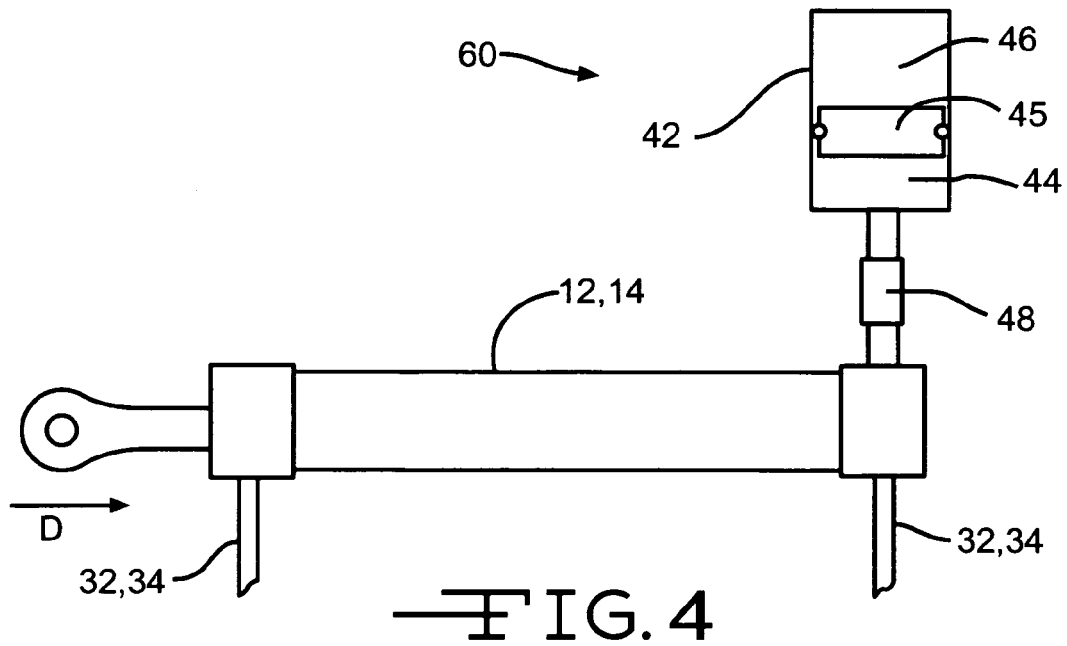
FIG. 4 is an illustration similar to that of FIG. 3 but showing the secondary activation system connected to the actuator in accordance with a second embodiment of the present invention.

A second embodiment of the invention is shown in FIG. 4. This second embodiment is generally similar to the first embodiment described above and like reference numerals have been used for corresponding features. In this second embodiment the gas injector unit 40 of the first embodiment is omitted and the secondary activation system 60 comprises simply the displacement chamber assembly 42. In this embodiment in the event of a crash the crash loading on the actuator 12, 14 (in direction D) increases the pressure within the actuator chamber 56. This operates the pressure activated valve 48 allowing fluid to be displaced into chamber 44 of the displacement chamber assumably 42 and movement of the actuator 12, 14 under the crash load applied to the predetermined position. Cushioning of the impact loading and a degree of impact energy adsorption as well as control of the actuator 12, 14 movement is provided by the compression of the gas/air within the chamber 46 of the displacement chamber assembly 42. This arrangement is much simpler than the first embodiment and avoids the additional complexity of a gas injector unit 40.

In a variation to this second embodiment the pressure activation valve 48 could be replaced with a valve which is triggered and opened by a control signal from either seat 2 or vehicle crash sensors. In a yet further variation of this embodiment the second chamber 46 could be sealed and contain a vacuum such that when the valve 48 is triggered the vacuum move ths piston 45 drawing hydraulic fluid into the chamber 44 and moving the actuator 12, 14.

In the above described embodiments each individual actuator 12*a*, 12*b*, 14*a*, 14*b* is provided with a separate secondary activation system 60, for example separate gas injector unit 40 and/or displacement chamber assembly 42. It will though be appreciated that a single secondary activation system 60 could be used to operate both of a pair of actuators (or more) providing a particular vehicle seat adjustment, for example fore and aft seat adjustment actuators 14*a*, 14*b*. Furthermore a single secondary activation system 60 could be used to operate multiple actuators 12*a*, 12*b*, 14*a*, 14*b* providing different vehicle seat adjustments, for example both fore and aft seat adjustment as well as seat back 4 position. Such arrangements will simplify the overall arrangement.

The actuators 12, 14 in the described embodiments comprise piston and cylinder arrangements, and this is the typical actuator arrangement used for hydraulic vehicle seat adjustment. Other actuator arrangements could of course be used with the secondary activation system in accordance with the invention.

The actuators 12, 14 may also incorporate system protection valves as described in co-pending UK application number 0324558.6 filed on 22 Oct. 2003, which is incorporated herein by reference. The system protection valves in the event of a crash or impact loading isolate the actuator 12, 14 from the remainder of the hydraulic circuit 10 by closing off the supply and return pipes 32, 34.

Whilst the above embodiments have been described with reference to a powered hydraulic adjustment system 10, the invention and use of a secondary activation system 60 can be applied to non-powered manual hydraulic adjustment arrangements in which the hydraulic actuators, by the use of control valves, simply lock the seat position which is adjusted by manual movement by a seat occupant. In addition the invention can also be applied to pneumatic adjustment systems.

It will also be appreciated that a number of further detail modifications can be made to the detailed arrangements described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle seat adjustment system comprising:
a vehicle seat having a seat portion and a back rest portion;
a hydraulic actuator that adjustably moves one of the seat portion and the back rest portion of the vehicle seat;
a primary activation system controlling a flow of hydraulic fluid to the hydraulic actuator, the hydraulic actuator moving the one of the seat portion and the back rest portion of the vehicle seat; and
a secondary activation system which is activated in the event of a detected impact, the secondary activation system activating the hydraulic actuator and automatically moving the one of the seat portion and the back rest portion of the vehicle seat.

2. A vehicle seat adjustment system as claimed in claim 1 in which the secondary activation system automatically adjusts the position of the one of the seat portion and the back rest portion of the vehicle seat towards a predetermined position.

3. A vehicle seat adjustment system as claimed in claim 1 in which the secondary activation system automatically adjusts the position of the one of the seat portion and the back rest portion of the vehicle seat by a predetermined amount.

4. A vehicle seat adjustment system as claimed in claim 1 in which the secondary activation system automatically adjusts the position of the one of the seat portion and the back rest portion of the vehicle seat by a variable amount.

5. A vehicle seat adjustment system as claimed in claim 1 in which the secondary activation system comprises a chamber and a valve connected to the actuator which, when activated, operate to allow fluid to be displaced and flow from the hydraulic actuator through the valve into the chamber.

6. A vehicle seat adjustment system as claimed in claim 5 in which the valve comprises a pressure activated valve which opens when the pressure within the actuator exceeds a predetermined level.

7. A vehicle seat adjustment system as claimed in claim 5 in which the valve comprises a non-return valve.

8. A vehicle seat adjustment system as claimed in claim 5 in which a movable piston divides the chamber into a first chamber to receive fluid from the actuator and a second chamber containing a compressible gas.

9. A vehicle seat adjustment system as claimed in claim 8 in which the second chamber is sealed.

10. A vehicle seat adjustment system as claimed in claim 1 in which the secondary activation system comprises a fluid injection unit which supplies a quantity of fluid to the actuator.

11. A vehicle seat adjustment system as claimed in claim 10 in which the fluid supplied by the fluid injection unit is a gas.

12. A vehicle seat adjustment system as claimed in claim 1 in which there are two or more hydraulic actuators arranged for adjusting the position of the one of the seat portion and the back rest portion of the vehicle seat and the secondary activation system comprises a single secondary activation system connected to the two or more actuators.

13. A vehicle seat adjustment system as claimed in claim 1 in which there is a first set of hydraulic actuators arranged for adjusting the position of a first one of the seat portion and the back rest portion of the vehicle seat, a second set of hydraulic actuators arranged for adjusting the position of a second one of the seat portion and the back rest portion of the vehicle seat, and a single secondary activation system is connected to the first and second set of hydraulic actuators.

14. A vehicle seat adjustment system as claimed in claim 1 in which the hydraulic actuator comprises a movable piston located within a cylinder.

15. A vehicle seat adjustment system as claimed in claim 1 in which the hydraulic actuator is arranged to adjust the fore and aft position of the vehicle seat within a vehicle.

16. A vehicle seat adjustment system as claimed in claim 1 in which the hydraulic actuator is arranged to adjust the tilt angle of a seat bottom cushion of the vehicle seat to raise the front of the seat bottom cushion relative to the rear of the seat bottom cushion.

17. A vehicle seat adjustment system as claimed in claim 1 in which the secondary activation system is selectively armed for activation in the event of a detected crash.

18. A vehicle seat adjustment system as claimed in claim 1 wherein the secondary activation system includes a fluid injection unit, which supplies a quantity of the fluid to the actuator, and a chamber and a valve connected to the actuator which, when activated, operates to allow fluid to be displaced and flow from the hydralic actuator through the valve into the chamber.

* * * * *